Patented Aug. 24, 1954

2,687,374

UNITED STATES PATENT OFFICE 2,687,374

FILTRATION METHOD

David T. Mowry and Ross M. Hedrick, Dayton, Ohio, assignors to Monsanto Chemical Company, St. Louis, Mo., a corporation of Delaware No Drawing. Application April 27, 1951,
Serial No. 223,442

16 Claims. (Cl. 210—2)

This invention relates to methods of treating water, aqueous solutions, and aqueous suspensions for the purpose of purification or separation of solid content. More specifically, the invention relates to a filtering medium for the said aqueous treating methods.

One purpose of this invention is to provide a method of filtering solid material from an aqueous medium in which it is suspended or dispersed. By this proposed method, mud, silt, and other naturally occurring suspensions may be removed from water streams prior to industrial uses. Similarly, the method should be useful to clarify public water supplies.

A further purpose of the invention is to remove fermentable wastes from sewage and aqueous industrial wastes by bacterial action prior to discharging the effluents into water courses or other normal disposal channels. In the proposed manner contamination of streams and rivers may be avoided or minimized.

A still further purpose of the invention is to provide a novel and inexpensive filtering and ion-exchanging medium, suitable for separating solid matter and undesired soluble inorganic matter from water or other liquids. The proposed filter medium may be prepared from abundantly available impervious or semi-impervious clay or silt soils.

In accordance with this invention it has been found that clay, silt, or other finely divided soil can be aggregated into water-stable granular form by mixing with it a water-soluble linear polymer containing hydrophilic radicals, and thereafter forming the mixture into crumbs, or aggregates, by merely agitating the mixture. The stable granular soil particles retain their shape and size indefinitely as long as they are not broken down by physical action. Natural stresses by alternate freezing and thawing, rain-drop impact and alternate wetting and drying have little or no effect on the structure of the particles. Normally impervious, or semi-impervious soils are rendered completely permeable to water by means of treatment with water-soluble linear polymers. Water, aqueous solutions and aqueous suspensions will readily pass into a body of the aggregated soil and suspended solid matter will be filtered off and collected on the surface of the soil, or in the interstices, especially in the upper part of the soil body. Since the soil is also readily pervious to air, aerobic bacterial action may proceed with the destruction of the organic matter and undesirable organisms which might be present. After the water-soluble linear polymers are adsorbed by the silt and clay, they are remarkably resistant to bacterial attack and keep the granular soil stabilized for long periods of time.

Suitable water-soluble linear polymers are the synthetic linear polymers containing water solubilizing radicals, such as carboxyl, carboxy acid salts, hydroxyl, amide and quaternary ammonium salt radicals, appended thereto. Since the polymers will only be used in small proportions and in the use are dissolved in the soil water, the required extent of water solubility is small.

One type of synthetic linear polymers are the polymers of acrylic derivatives of the following structural formula:

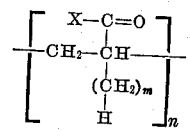

wherein X is a solubilizing radical of the group consisting of —OK, —ONa, —ONH4, —ONR'H3, —ONR'2H2, —ONR'3H, —ONR'4, —OH, —NH2, —OCH2NR'2, —OCH2CH2NR'2, —NHR' and —NR'2, R' is an alkyl radical having up to four carbon atoms, m is a small whole number from zero (0) to one (1), inclusive, and n is a whole number indicative of the extent of polymerization. In addition the water-soluble copolymers of the same acrylic and methacrylic acid derivatives and other copolymerizable monomers such as styrene, vinyl acetate, acrylonitrile, methacrylonitrile, butadiene, the alkyl acrylates, the alkyl methacrylates, vinylidene chloride, vinyl chloride, the alkyl maleates, the alkyl fumarates, α-methylstyrene, and other olefinic compounds capable of polymerization with the acrylic and methacrylic acid derivatives described.

Another useful class of compounds useful in the practice of this invention are those represented by the structural formula:

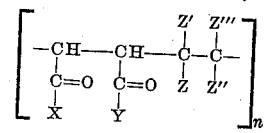

wherein X and Y may be the same or different radicals of the group consisting of —OK, —ONa, —O½Ca, —ONH4, —ONR'H3, —ONR'2H2

—ONR'3H, —ONR'4, —OH, —NH2

—OCH2—N—R'2, —OCH2—CH2—NR'2, —OR'

—N—C2H4—NR'2, —NHR' and —NR'2, not more than one of X and Y being —OR', and wherein Z, Z', Z'', and Z''' are radicals of the group consisting of —OCOCH$_3$, —OCOH, —OH, —Cl, —CH$_3$, —COOH, —C$_6$H$_5$, —H, —OR, and —COOR, a plurality of Z, Z', Z'' and Z''' being hydrogen, and not more than one of the Z, Z', Z'' and Z''' being of the group —OCOCH$_3$, —OH, —C$_6$H$_5$, —OCOH, —OR, —COOR and —COOH, and all of the radicals of the group Cl and CH$_3$, being attached to the same carbon atom, R in the above formula representing an aliphatic hydrocarbon radical containing from one to four carbon atoms.

Suitable maleic acid copolymers useful in the practice of this invention are the copolymers of maleic acid, maleic anhydride, maleamic acid, maleic amide, the alkali and alkaline earth metal and ammonium maleic acid salts, the di($\beta$-aminoethyl) maleate, di(methylaminoethyl) maleate, di(N,N-dimethyl $\beta$-aminoethyl) maleate, and the various salts, amides and aminoalkyl esters of the alkyl half esters of maleic acid, and other olefinic monomers polymerizable therewith. Of especial value are the copolymers of maleic derivatives in which the alkyl radicals have up to four carbon atoms. Similar copolymers of derivatives of chloromaleic and citraconic acids may also be used.

Other compounds useful in the practice of this invention are the polymers of acrylic and methacrylic acid derivatives, including acrylic acid, methacrylic acid, acrylamide, methacrylamide, the alkali metal, amine and ammonium salts of either acrylic or methacrylic acid, $\beta$-aminoethyl acrylate, $\beta$-aminoethyl methacrylate, $\beta$-methyl aminoethyl acrylate, $\beta$-methyl aminoethyl methacrylate, N,N-dimethyl $\beta$-aminoethyl methacrylate, and the N-alkyl substituted acrylamides and methacrylamides.

Still other useful water-soluble synthetic polymers are the polymers of sulfonated polystyrene, polyvinyl alcohol, polyvinyl pyridine and other olefinic polymers containing carboxyl, hydroxyl, carboxyl salt, and quaternary ammonium salt radicals. Copolymers containing the solubilizing groups are also useful, which copolymers may be prepared by copolymerizing the monomers containing the said groups, or by preparing the olefinic copolymers and introducing the solubilizing groups by hydrolysis, alkylation or sulfonation.

Very effective water-soluble polymers may be prepared by the hydrolysis of polymers of esters, such as polyvinyl acetate, or other polyvinyl esters, methyl acrylate, or other alkyl acrylates, methyl methacrylate, or other alkyl methacrylates, and acrylonitrile. Similarly copolymers of two or more of the hydrolyzable monomers, or copolymers of hydrolyzable monomers and other monomers, such as styrene, vinyl chloride, vinylidene chloride, $\alpha$-methylstyrene, isopropenylbiphenyl and vinylbiphenyl may be hydrolyzed to form useful water-soluble linear polymers.

In the selection of water-soluble linear polymers for the practice of this invention some consideration should be given to molecular weight. It has been found desirable to use polymers with molecular weights of at least 10,000, and preferably greater than 15,000. For the optimum results polymers with molecular weights from 30,000 to 100,000 are recommended. Although polymers with molecular weights above 100,000 are very useful, further increases in the degree of beneficial results are often not observed. Very high molecular weight linear polymers sometimes are more difficult to use due to the viscosity of the dilute water solutions and the low rate of diffusion of the polymer in soil water, but excellent water stability of the soil aggregates will be achieved.

The linear polymers of both high and low molecular weights will be substantially free of highly branched chains and chemically cross-linked or gelled structures.

The present invention is practiced by using the aggregated soils as a filter medium merely by allowing the solutions or suspensions to be filtered to pass through the body of the soil, whereby suspended clay and silt particles may become adsorbed on the stable soil granules or become agglomerated into new and separate aggregates. Other suspended matter will simultaneously be separated by filtration procedure which is expediated by the ease with which the aqueous liquid passes through the body of the aggregated soil.

The invention may be practiced in open tanks or vats with water-impervious walls provided with inlets and outlets for the fluid located at suitable points. In such cases the soil may be excavated from nearby areas, mixed with the proper quantity of the polymer in a suitable mixing device, and then aggregated by mechanically working the soil mixture. After suitable crumbs or granules have been formed the treated soil may then be placed in the prepared container by means of bulldozers or other earth-moving machinery. The period of life of such a filter bed will depend upon the quantity of solid to be removed from the water stream. Obviously if large quantities of solids must be removed, the cost of such a structure will be prohibitive, unless the tank is provided with a means for reversing the flow to flush the bed of its accumulated deposit of solid matter which will occur primarily at the surface.

This invention may also be practiced by passing the solutions or suspensions to be treated into a large open area, the surface of which has been aggregated to a substantial depth by means of the water-soluble polymers. When using this modification of the invention, the aqueous liquid may be allowed to dissipate through the sub-soil in the normal manner or by gently sloping the treated area, the liquid may be collected at a lower point and then conducted through a regularly defined channel to a suitable point of disposal. If the aqueous suspensions to be treated contain substantial quantities of solid matter the surface pores and interstices of the treated area may become clogged and the permeability of the soil bed impaired. In this case the area may be regenerated by scraping the surface with suitable grading equipment and retreating the new surface if necessary with water-soluble linear polymer. In this manner the areas may be used indefinitely for practicing this invention.

Many aqueous industrial wastes contain organic substances which are toxic to plant and animal life and therefore cannot be discharged through the usual sewage channels. Other wastes, not in themselves toxic, may also be injurious to fish and other stream life due to the high oxygen demand of bacterial decomposition. This invention is useful in processing these wastes by a modification which is adapted to encourage aerobic bacterial fermentation. By aggregating soils in natural state on slightly sloping areas, or by disposing the aggregated soil in shallow receptacles, and then flowing the waste liquids through the soil bodies in relatively small quantities effective bacterial decomposition may be achieved. The optimum result of this form of the invention requires the use of soil bodies and waste liquid proportions, such that the interstices of the aggregated soil are not entirely filled with the liquid. Under these conditions an optimum rate of aerobic bacterial decomposition may be achieved, without serious reduction in treating capacity. This type of waste disposal will be useful in the fermentation of milk waste fluids, distillery wastes, fermentation wastes, wastes from paper manufacturing plants, and other wastes capable of supporting aerobic fermentation.

Further details of the invention are set forth with respective to the following examples:

EXAMPLE 1

The following data show the improved infiltration and percolation of water through the soil treated with water-soluble linear polymers. Miami silt loam was treated with various polymers, the soil allowed to dry and then forced through a one mm. sieve. The soil was packed by tapping into a column about one inch in diameter. A one inch head of water was maintained above the soil and the time was determined for penetration of the water to a depth of six inches in the soil. The data obtained with several treated soils are shown in Table I.

Table I

| Polymers Used to Treat Miami Silt Loam | Time required for Six inches Penetration of water (minutes) |
|---|---|
| Control | 92 |
| 0.1% Vinyl acetate-maleic acid ($NH_4^+$ salt) | 16.5 |
| 0.05% Vinyl acetate-maleic acid ($NH_4^+$ salt) | 20 |
| 0.01% Vinyl acetate-maleic acid ($NH_4^+$ salt) | 43.5 |
| 0.1% Isobutylene-maleic acid ($NH_4^+$ salt) | 38 |
| 0.1% Vinyl methyl ether-maleic acid ($NH_4^+$ salt) | 36.7 |
| 0.1% Polyacrylamide | 18 |
| 0.033% Polyacrylamide | 27 |
| 0.1% Polymethacrylic acid ($NH_4^+$ salt) | 51.2 |
| 0.1% Sulfonated Polystyrene | 78.5 |

EXAMPLE 2

An aqueous solution containing 100 p. p. m. of 2,4-dichlorophenoxyacetic acid was continuously cycled through porous crumbs of an alluvial soil treated with 0.1% polyacrylamide. At weekly intervals one ml. samples of the solution were assayed for 2,4-dichlorophenoxyacetic acid. The rate of bacterial decomposition was as follows:

Time (Weeks):  P. p. m. 2,4-D
0 ----------------------------------------
2 ---------------------------------------- 100
3 ---------------------------------------- 100
4 ---------------------------------------- 72
5 ---------------------------------------- 3
                                           0.1

A fresh solution containing 100 p. p. m. of 2,4-dichlorophenoxyacetic acid was cycled through the same soil and a sample taken after one week. The concentration of 2,4-dichlorophenoxyacetic acid after one week was one p. p. m. Thus, organisms accumulate in soil which have the ability to decompose a specific organic material.

A number of experiments attempted with untreated alluvial soil crumbs was unsuccessful because the crumbs slaked down to mud through which the solution of 2,4-dichlorophenoxyacetic acid could not be cycled.

What we claim is:

1. The method of decontaminating aqueous waste liquids which comprises percolating them through a body of aggregated soil in which there has been dispersed a synthetic water-soluble polymer having a structure derived by the polymerization of a mono-olefinic compound through its aliphatic unsaturated groups, and containing hydrophilic substituents selected from the group consisting of carboxyl, alkali metal carboxy salt, alkaline earth metal carboxy salt, ammonium carboxy salt, carboxy amide, sulfonic acid salt, tertiary amino and hydroxyl radicals, said polymers having a molecular weight of at least 10,000 having sufficient hydrophilic substituents to render the soil aggregates water stable.

2. The method of claim 1 in which the polymer is polyacrylamide.

3. The method of claim 1 in which the polymer is the ammonium salt of polyacrylic acid.

4. The method of claim 1 in which the polymer is the sodium salt of a copolymer of vinyl acetate and maleic acid.

5. The method of claim 1 in which the polymer is the half calcium salt of a copolymer of vinyl acetate and maleic acid.

6. The method of claim 1 in which the polymer is a hydrolyzed polymer of acrylonitrile.

7. The method of decontaminating aqueous waste liquids which comprises percolating them through a body of aggregated soil in which there has been dispersed a small amount but not more than five per cent of a synthetic water-soluble polymer having a structure derived by the polymerization of a mono-olefinic compound through its aliphatic unsaturated groups, and containing hydrophilic substituents selected from the group consisting of carboxyl, alkali metal carboxy salt, alkaline earth metal carboxy salt, ammonium carboxy salt, carboxy amide, sulfonic acid salt, tertiary amino and hydroxyl radicals, said polymers having sufficient hydrophilic substituents to render the soil aggregates water stable and having a molecular weight sufficient so as to render soil aggregates treated therewith stable to the erosive action of water.

8. The method of decontaminating aqueous waste liquids which comprises percolating them through a body of aggregated soil in which there has been dispersed a small amount but not more than five per cent of a synthetic water-soluble polymer having a structure derived by the polymerization of a mono-olefinic compound through its aliphatic unsaturated groups, and containing hydrophilic substituents selected from the group consisting of carboxyl, alkali metal carboxy salt, alkaline earth metal carboxy salt, ammonium carboxy salt, carboxy amide, sulfonic acid salt, tertiary amino and hydroxyl radicals, said polymer having a molecular weight greater than 10,000.

9. The method of decontaminating aqueous waste liquids which comprises percolating them through a body of aggregated soil in which there has been dispersed a synthetic water-soluble polymer having a structure derived by the polymerization of a monoolefinic compound through its aliphatic unsaturated groups, and containing hydrophilic substituents selected from the group consisting of carboxyl, alkali metal carboxy salt, alkaline earth metal carboxy salt, ammonium carboxy salt, carboxy amide, sulfonic acid salt, tertiary amino and hydroxy radicals, and recovering the treated liquid, said polymer being present in sufficient amount to render the soil aggregates water stable so as to render soil aggregates treated therewith stable to the erosive action of water.

10. The method of claim 9 in which the polymer is polyacrylamide.

11. The method of claim 9 in which the polymer is the ammonium salt of polyacrylic acid.

12. The method of claim 9 in which the polymer is the sodium salt of a copolymer of vinyl acetate and maleic acid.

13. The method of claim 9 in which the polymer is the half calcium salt of a copolymer of vinyl acetate and maleic acid.

14. The method of claim 9 in which the polymer is a hydrolyzed polymer of acrylonitrile.

15. The method of decontaminating aqueous waste liquids which comprises percolating them through a body of aggregated soil in which there has been dispersed a synthetic water-soluble polymer having a structure derived by the polymerization of a mono-olefinic compound through its aliphatic unsaturated groups, and containing hydrophilic substituents selected from the group consisting of carboxyl, alkali metal carboxy salt, alkaline earth metal carboxy salt, ammonium carboxy salt, carboxy amide, sulfonic acid salt, tertiary amino and hydroxyl radicals, the volume of aqueous waste liquid being less than that which would saturate the soil, said polymer having a molecular weight of at least 10,000 and being present in sufficient amount to render the soil aggregates water stable.

16. The method of decontaminating aqueous waste liquids which comprises percolating them through a body of aggregated soil in which there has been dispersed a small amount but not more than five per cent of a synthetic water-soluble polymer having a structure derived by the polymerization of a mono-olefinic compound through its aliphatic unsaturated groups, and containing hydrophilic substituents selected from the group consisting of carboxyl, alkali metal carboxy salt, alkaline earth metal carboxy salt, ammonium carboxy salt, carboxy amide, sulfonic acid salt, tertiary amino and hydroxyl radicals, and recovering the treated liquid, the volume of said aqueous liquid being less than that which would saturate the soil, said polymer having a molecular weight of at least 10,000.

References Cited in the file of this patent

UNITED STATES PATENTS

| Number | Name | Date |
| --- | --- | --- |
| 2,281,194 | Holmes et al. | Apr. 28, 1942 |
| 2,340,110 | D'Alelio | Jan. 25, 1944 |
| 2,367,384 | Tymstra et al. | Jan. 16, 1945 |
| 2,541,005 | Oldham et al. | Feb. 6, 1951 |
| 2,552,775 | Fischer et al. | May 15, 1951 |

OTHER REFERENCES

Soil Science; vol. 41, 1936, pages 417–431.

Journal Society Chem. Ind. (London); vol. 68, 1949, pages 69–79.